Oct. 15, 1935.  S. G. TAYLOR  2,017,358
HEARING AID APPARATUS AND AMPLIFIER
Filed July 1, 1932  7 Sheets-Sheet 1
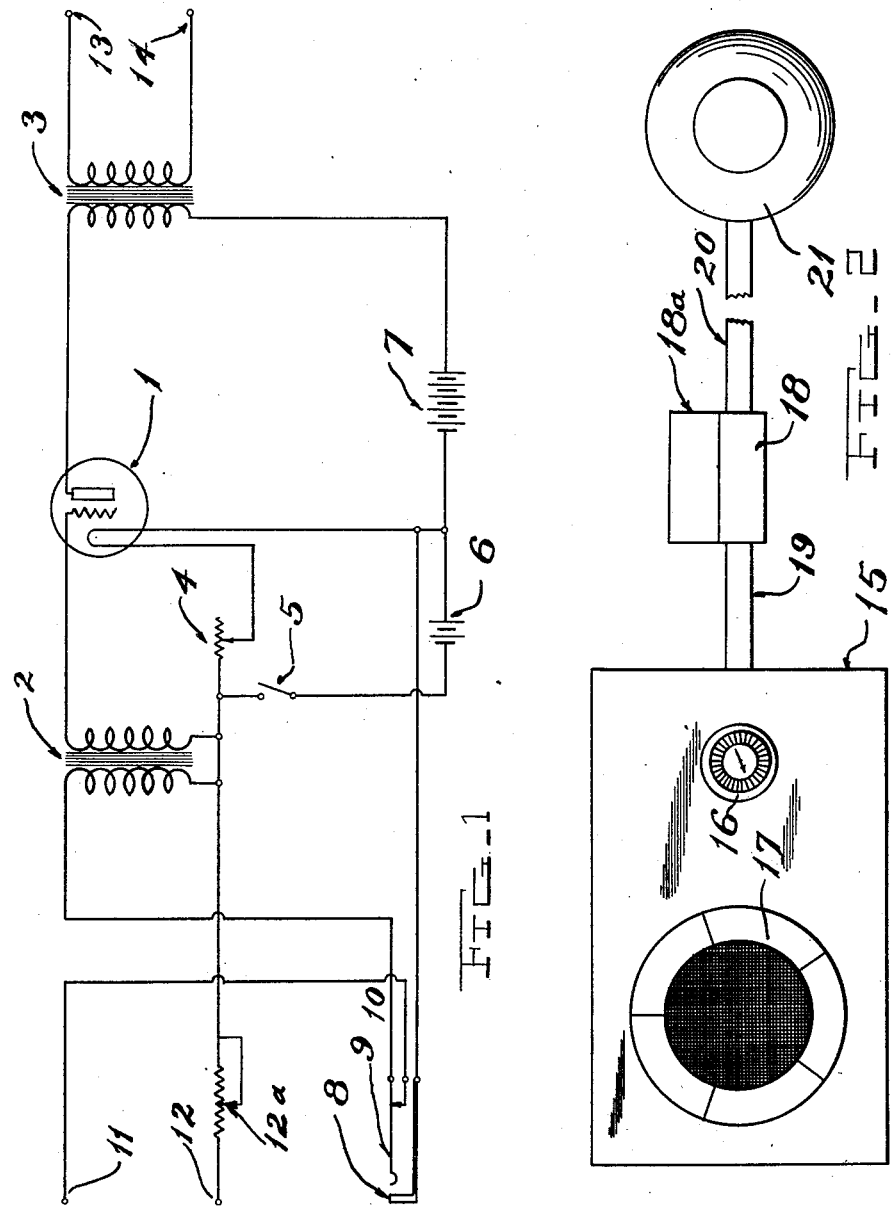
Inventor
Samuel Gordon Taylor
By Ben J. Chromy his Attorney Oct. 15, 1935. S. G. TAYLOR 2,017,358
HEARING AID APPARATUS AND AMPLIFIER
Filed July 1, 1932 7 Sheets-Sheet 2

Inventor
Samuel Gordon Taylor
By Benj. Chromy
His Attorney

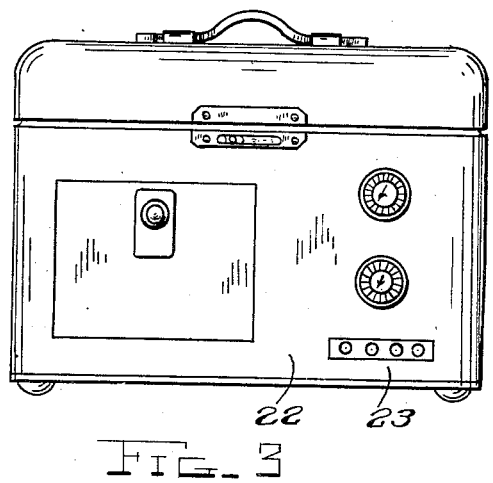
FIG. 3
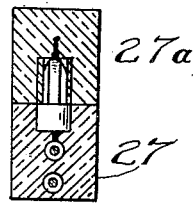
FIG. 6
FIG. 5
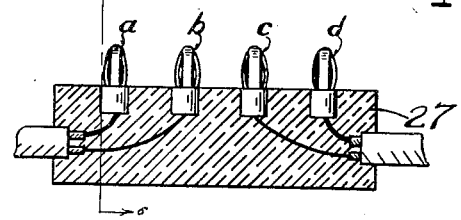
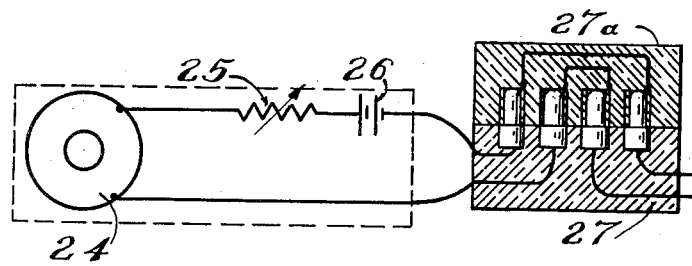
FIG. 4

Oct. 15, 1935.  S. G. TAYLOR  2,017,358
HEARING AID APPARATUS AND AMPLIFIER
Filed July 1, 1932  7 Sheets-Sheet 4
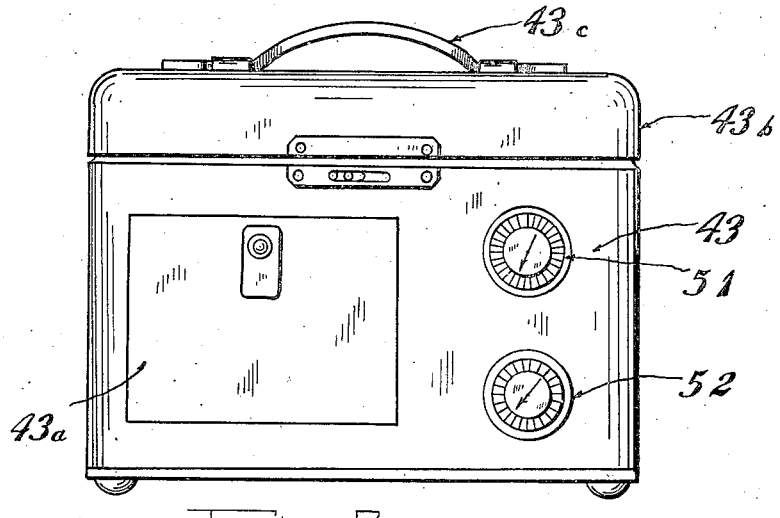
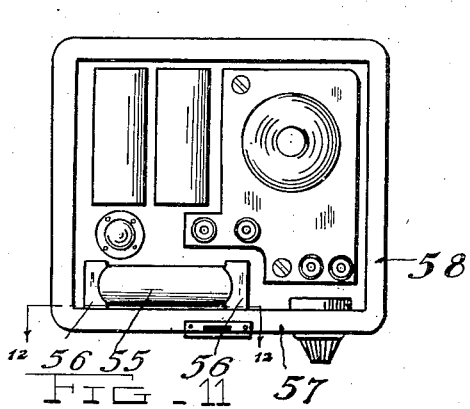
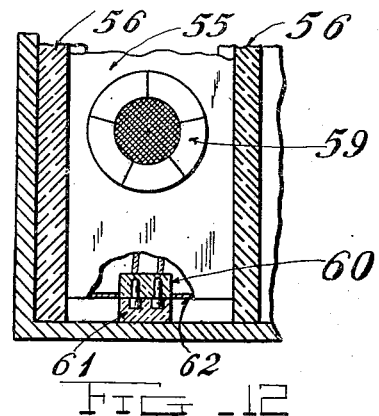
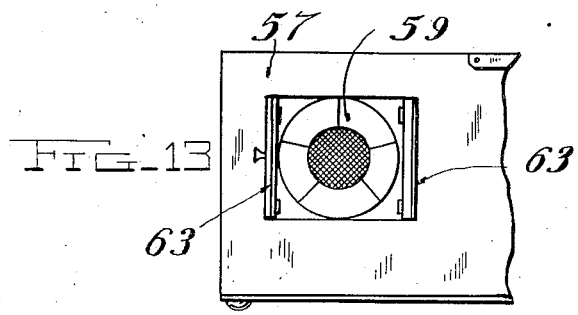
Inventor
Samuel Gordon Taylor
By Bm J. Chromy  his Attorney

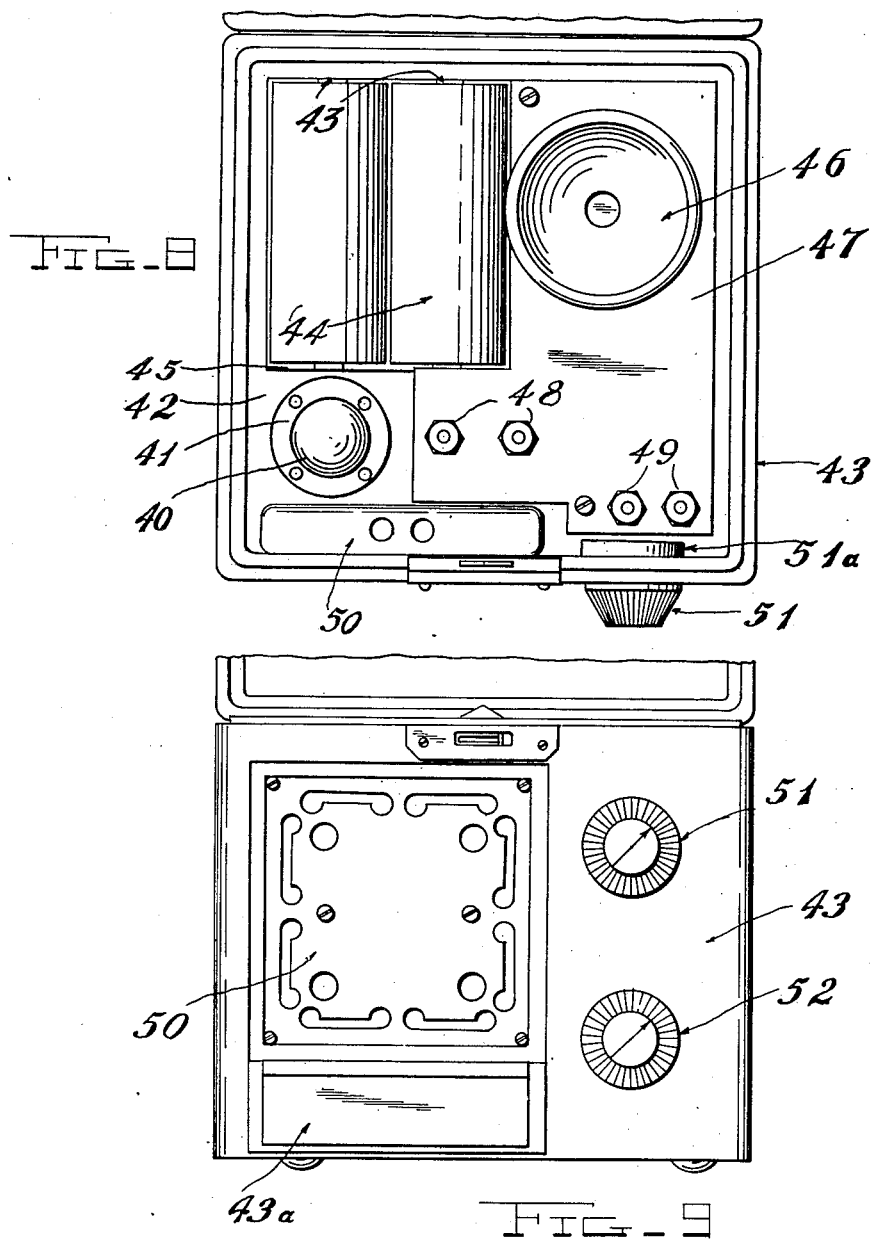

Oct. 15, 1935.  S. G. TAYLOR  2,017,358
HEARING AID APPARATUS AND AMPLIFIER
Filed July 1, 1932  7 Sheets-Sheet 7
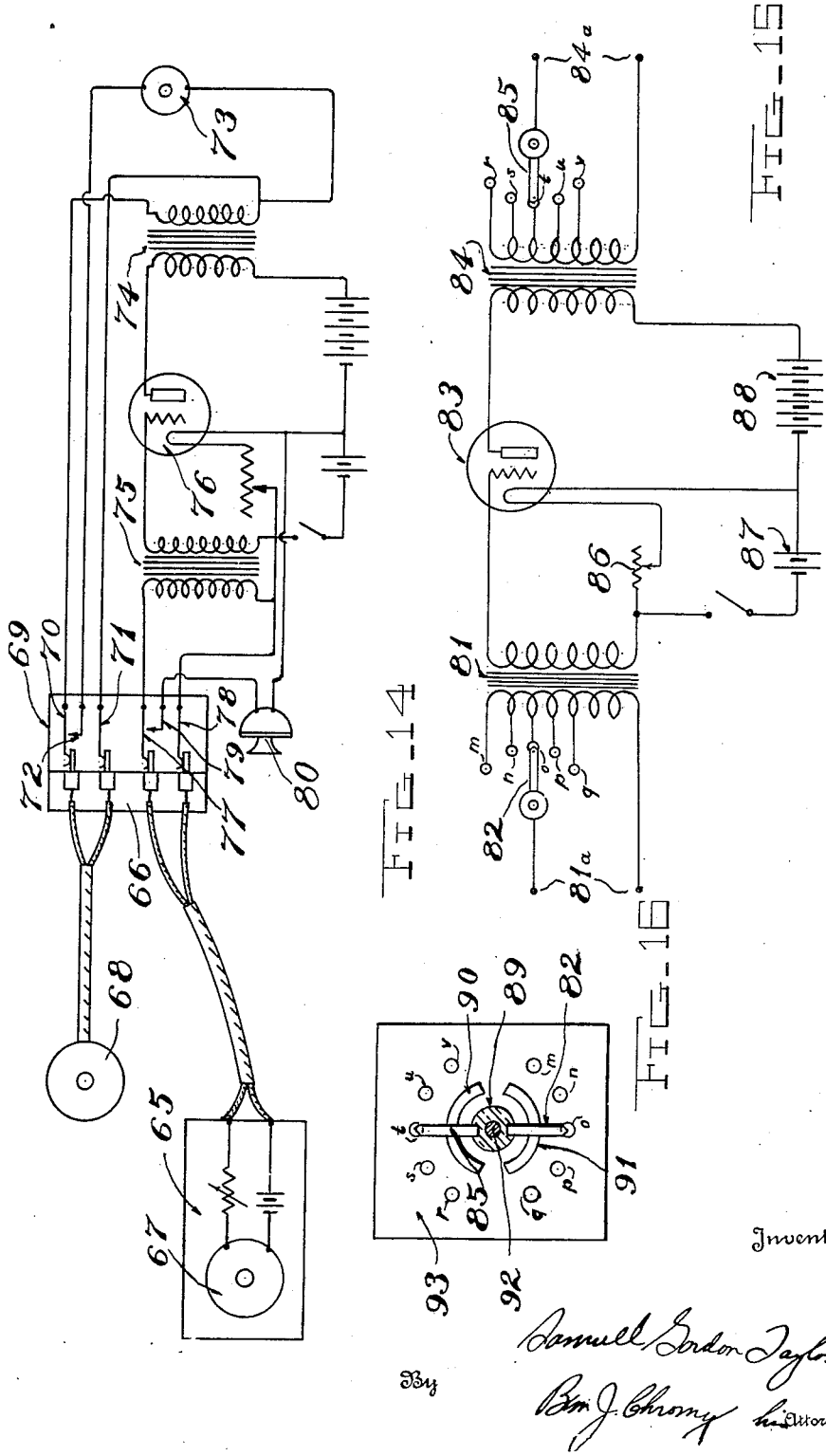

Patented Oct. 15, 1935

2,017,358

UNITED STATES PATENT OFFICE 2,017,358

HEARING AID APPARATUS AND AMPLIFIER

Samuel Gordon Taylor, New York, N. Y.

Application July 1, 1932, Serial No. 620,512

9 Claims. (Cl. 179—107)

This invention relates to apparatus of a portable or semi-portable nature employed to intensify the effect of sound whereby hard of hearing persons employing the apparatus are greatly aided in their ability to hear.

An object of this invention is to provide a booster amplifier having the component parts thereof self contained, which may be conveniently and readily used in conjunction with portable microphone and headset apparatus of the type employed by hard of hearing persons, to intensify the sound to a comfortable hearing level.

Another object of this invention is to provide a booster amplifier having the component parts thereof self contained, which may be conveniently and readily used in conjunction with different types of portable microphones and headset apparatus having different electrical characteristics.

Still another object of this invention is to provide an amplifier of the booster type for hearing aid apparatus having the component parts thereof self contained, which may be used at maximum sound reproduction efficiency with different types of hearing aid microphones and headsets.

A further object of this invention is to provide hearing aid apparatus which may be automatically connected for use either with or without a booster amplifier.

Still a further object of this invention is to provide hearing aid apparatus having the component parts thereof self contained, in which the microphone and telephone headsets are adapted for use as a hearing aid unit of moderate sensitivity which may be automatically connected to a booster amplifier to increase the usefulness thereof and adapt the apparatus for office or home use.

Still another object of this invention is to provide an amplifier arrangement having apparatus adapted to have a plurality of hearing aid telephone receivers connected to the output circuit thereof whereby more than one person may use the hearing aid apparatus, if desired.

Other and further objects of this invention will be apparent to those skilled in the art to which it relates from the following specification.

In accordance with this invention amplifier which may be readily used with different types of hearing aid devices, such as transformer or direct coupled microphones and headset telephones, is made entirely self contained and is provided with adjustable means arranged in the circuits thereof so that the microphone and telephone headset of the hearing aid may be readily disconnected from the hearing aid or from each other and connected to the amplifier for use in office, home, theater or any other place where desirable. This may be accomplished in any one of the different ways set forth in the specification.

Various forms of hearing aids known at present employ a transformer or direct coupled microphone and telephone headset of a variety of different electrical characteristics. For example, the telephone headsets used in different makes of hearing aids may have a direct current resistance of from five ohms to several hundred ohms. It is important that these characteristics be properly matched in the booster amplifier to be used efficiently and advantageously with a hearing aid.

These different instruments each having different electrical characteristics have their limited use, since the present-day demands require that speech and music be reproduced properly and undistortedly. In accordance with this invention hearing aid apparatus of various types may be conveniently used in conjunction with the apparatus of my invention not only in the proper and undistorted reproduction of conversations and music, but in the modification of original sounds by the suppression or emphasis of certain sound frequencies to compensate for differences in the hearing range of different persons.

The various adjustments necessary to accomplish these results have been simplified so that persons not skilled in the manipulation of electrical apparatus are able to obtain highly satisfactory results therefrom.

I have described and illustrated my invention in considerable detail in the following specification and the drawings, in which briefly:

Figs. 1 and 1a illustrate schematic circuit diagrams;

Figs. 2 and 2a illustrate hearing aid units;

Fig. 3 is a view in front elevation of an embodiment of the amplifier of this invention;

Fig. 4 illustrates a hearing aid unit adapted for use with the amplifier illustrated in Fig. 3;

Figs. 5 and 6 illustrate a connecting plug;

Figs. 7, 8, 9, 10 and 10a show exterior and interior views of a practical embodiment of a form of this invention;

Figs. 11, 12, 12a and 13 show an embodiment of a modified form of this invention;

Figs. 14 and 15 illustrate schematic circuit diagrams, and

Fig. 16 illustrates a switch employed in accordance with a modified form of this invention.

Figure 1A:
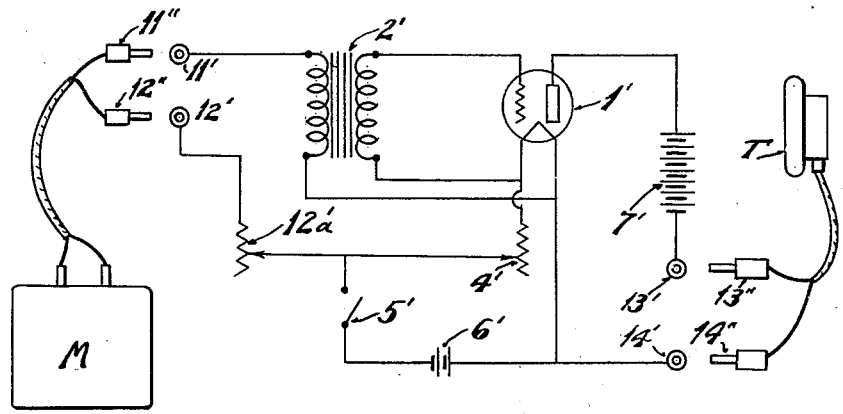
Figure 2A:
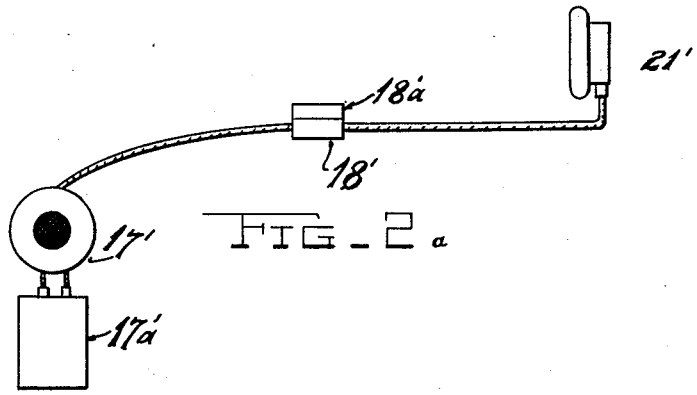

Referring to Fig. 1 of the drawings in detail, reference numeral 1 designates an electron discharge device amplifier having cathode, anode and grid electrodes. This device may be of any of the conventional types used for amplifying the effect of voice or sound modulated currents and may employ additional grid electrodes, such as the screen grid and suppressor grid, where desired. The secondary of the input transformer 2 is connected to the input circuit of the amplifier 1, the proper precaution being taken to match the output impedance of the transformer to the input impedance of the amplifier. Similar precaution is exercised in matching the operating characteristics of the microphone, which is connected either to the terminals 11 and 12 or the jack 8, to the input impedance of the transformer under different operating conditions.

Where it is desired the variable input resistance 12ª may be incorporated into the input circuit of the transformer 2 to vary the battery voltage applied to the microphone and thereby effectively varying the sensitivity of the microphone for the purpose of controlling the output volume. Where this amplifier is employed in conjunction with hearing aids incorporated into a separate unit, a variable resistance similar to the unit 12ª is usually already connected in series with the microphone, as illustrated in Fig. 2 of the drawings, wherein control knob 16 operates a variable resistance connected in series with the microphone. This form of control is satisfactory for the purpose of matching the circuit components, and also to control the volume of the output. Another possible method of volume control is in the use of the filament rheostat 4 of the amplifier 1. This rheostat is connected to the cathode of the amplifier 1 and to the switch 5 which is connected to the battery 6 or other suitable source of current supply. In this way the voltage applied to the filament of the amplifier tube and the microphone are varied simultaneously.

The jack 8 is connected into the primary circuit of the transformer 2 and to the source of current supply 6 so that the amplifier 1 can be used either with a hearing aid in which a battery 26 is provided for the microphone, as illustrated in Fig. 4 of the drawings, or with a hearing aid in which a microphone battery is not provided or where it is undesirable to use the microphone battery. In cases where the hearing aid is connected as illustrated in Fig. 4 the microphone output is connected to the terminals 11 and 12, and in cases where the hearing aid microphone is used without a separate microphone battery a telephone or similar plug is provided to the hearing aid for insertion into the jack 8.

Terminals 13 and 14 are provided to the secondary of transformer 3 for connecting to the terminals of a telephone receiver. These terminals 13 and 14 may be grouped with the terminals 11 and 12 to form a unitary jack for receiving the plug 18 shown in Fig. 2.

A source of current supply 7 is connected to the primary of the transformer 3 and to the cathode of the amplifier 1 to energize the anode circuit of this amplifier. This source of current supply is preferably of a very compact dry cell type suitable for portable apparatus; however, any convenient size or form of current supply may be used. The source 6 is also preferably, but not necessarily, of the dry cell battery type. Where dry cells are used for energizing the filament or cathode of the amplifier it is preferable to use an electron discharge device of low filament current consumption for economical operation.

Another circuit arrangement is illustrated in Fig. 1ª in which the microphone M is connected to the small plugs 11'' and 12'' which are adapted to be inserted into the jacks 11' and 12', respectively. Connections are provided between the secondary of the transformer 2' and the grid circuit of the tube 1'. Jack 11' is connected direct to the transformer primary and jack 12' is connected to the filament of the tube 1' and filament battery 6'. Rheostat 12ª' is provided to control the current to the microphone M and rheostat 4' is provided to control the tube filament current. The circuits of these rheostats are controlled by the switch 5' which may be incorporated into either of the rheostats so as to be turned off when the particular rheostat is turned off.

Telephone receiver T is connected to the plugs 13'' and 14'' which cooperate with the jacks 13' and 14' to complete the circuit with the anode circuit and the telephone receiver. Battery 7' is provided to energize the anode circuit of the tube 1'.

Figure 10:
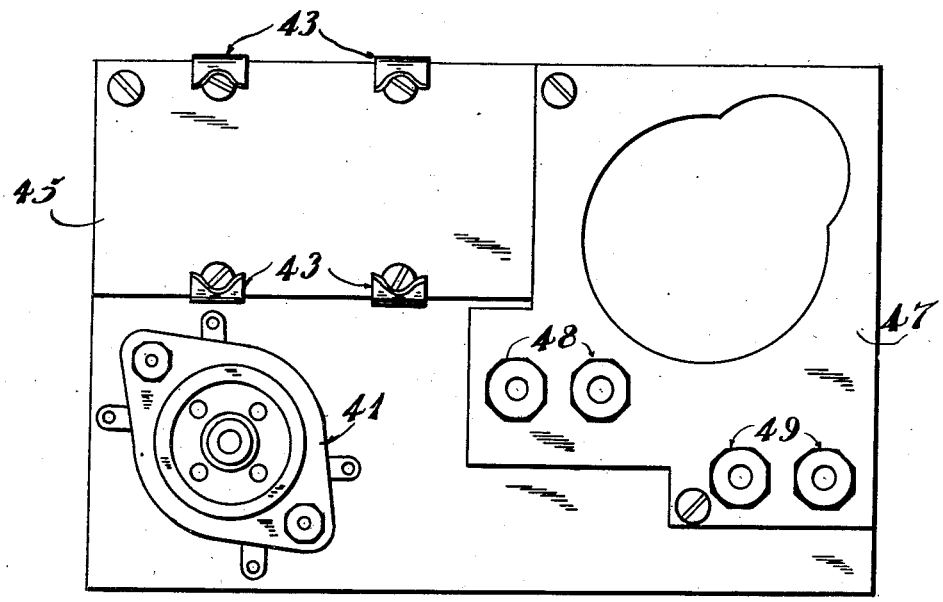
Figure 10A:
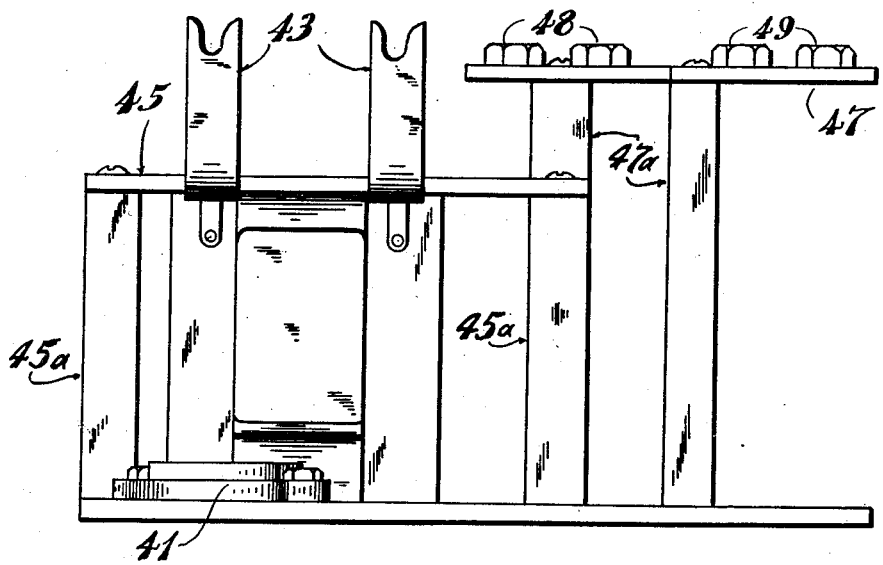

In Fig. 2 is illustrated a hearing aid unit employing a microphone 17 housed with one side thereof exposed, in the cabinet or casing 15. A variable resistance control 16 is also mounted on the cabinet for operation from the exterior of the cabinet. A suitable plug 18, corresponding to plug 27, illustrated in detail in Figs. 4 and 5, is connected by the cord 19 to the microphone 17 and by the cord 20 to the telephone 21. This hearing aid apparatus is adapted for use with the amplifier illustrated in Figs. 3, 10, 10ª, 11, 12, 12ª and 13. When the hearing aid is to be used without an amplifier the cap 18ª (Fig. 2) or similar connection is positioned upon the plug 18 to complete the circuits between the microphone 17, battery and the telephone 21. When the hearing aid is employed in conjunction with the amplifier the cap 18ª is removed and the plug is inserted into the jack 23 mounted in or on the amplifier cabinet 22 (Fig. 3). In this manner the hearing aid microphone and telephone receiver may be employed in conjunction with the amplifier or as a separate unit.

In Fig. 2ª is illustrated a simplified form of hearing aid in which the microphone 17' has attached to it a microphone battery case 17ª'. Connections are provided to the battery positioned in the case 17ª' so that this battery is connected in series with the microphone 17'. Connections are also provided between the plug 18' and cap 18ª', the microphone 17' and the telephone receiver 21' so that these units may be used either with or without a booster amplifier.

The circuit diagram of the amplifier which is housed in the cabinet 22 is disclosed and illustrated in detail in Figs. 12ª and 14 of the drawings, wherein the details of the circuit connections of the jack 23 are also shown in detail.

In Fig. 4 is illustrated in detail the circuit diagram of a hearing aid unit employing a microphone 24, connected to the variable resistance unit 25, battery 26, plug 27 and a telephone receiver 28. The connecting block 27ª is provided to the plug to connect the microphone circuit to the telephone receiver when the hearing aid is not to be employed in conjunction with an amplifier. The electrical connections between the tubular elements receiving the prongs of the plug are illustrated in Fig. 5, wherein a sectional view of the plug is shown.

The prongs $a$, $b$, $c$ and $d$ of the plug 27 are made to frictionally engage the tubular elements $a'$, $b'$, $c'$ and $d'$ of the cap 27ª. In cases where the prongs $a$ and $b$ are connected to the microphone circuit and the prongs $c$ and $d$ are connected to the telephone receiver circuit the tubular elements $a'$ and $d'$ are connected together and the tubular elements $b'$ and $c'$ are connected together. Other connections may be provided between these tubular members, depending upon the circuit arrangement between the prongs.

In Fig. 6, which is a sectional view along the line 6—6 of Fig. 5, the cap and plug are illustrated in engagement. The cap may be attached to the plug in any convenient manner; and, furthermore, the details of construction may be varied to meet the requirements of the particular case without departing from the scope or spirit of this invention.

The amplifier is contained in the cabinet 43 illustrated in Fig. 7. A door 43ᵇ is provided to close the top of the cabinet, and a handle 43c is attached to the top of the door to facilitate carrying the cabinet.

In Fig. 8 a horizontal interior view of the hearing aid amplifier apparatus is illustrated wherein the vacuum tube 40 is mounted in the socket 41 which is supported upon the false bottom 42, resting upon the bottom of the cabinet 43. Dry cells 44, which are connected to energize the filament of the vacuum tube 40, are supported upon the shelf 45; the position of this shelf is more clearly illustrated in Fig. 10 of the drawings. A telephone receiver 46 is supported in a recessed section of the shelf 47. The head band of the telephone receiver may be placed in a space provided on the inside of the cover. Jacks 48 and 49 for receiving the cord tips of a telephone receiver and a microphone, respectively, are mounted upon the shelf 47. This telephone receiver and microphone may be of any suitable type. Supports 45ª and 47ª are provided to the shelves 45 and 47 to maintain these shelves in spaced relation with respect to the false bottom 42. Spaces suitable for a B-battery used for supplying the anode current to the tube 40 and the transformer or transformers are provided beneath the shelves 45 and 47.

The shelves of the amplifier unit may be made of such material as hard rubber, phenol condensation products, wood, aluminum or similar substances. Where the terminals 43 which serve to retain the filament battery cells 44 in place and also serve to complete the electric circuit between these cells are mounted upon the shelf 45 it is obviously necessary that this shelf be made of insulating material unless suitable bushings are provided to the screws supporting the terminals 53 to space and insulate these terminals from the shelf.

Variable resistance 51ª is controlled by the knob 51 which is mounted on the front of the cabinet 43. Another knob 52, illustrated in Fig. 9, is positioned below the knob 51 for controlling another variable resistance unit and battery switch. These resistance units are employed for controlling the filament current of the vacuum tube and the volume of the output of the amplifier.

A small door 43ª is provided to the front of the cabinet 43 adjacent to the front of the microphone 50, which is positioned inside of the cabinet. When for convenience in use it is not desired to remove the microphone from the cabinet it may be left inside and the door 43ª opened. The amplifier cabinet may be placed upon the table for use in a semi-portable fashion or it may be kept upon a shelf or in a desk drawer.

A modified form of this invention is embodied in the apparatus illustrated in Figs. 11, 12, 12ª and 13. In this embodiment a hearing aid 55, of the type which may consist of a microphone, a variable resistance and a battery or only a microphone inclosed in a small case is slipped between the members 56 which are attached to the wall 57 of the cabinet 58. This cabinet 58 may be substantially the same as the cabinet 43 illustrated in Fig. 7. Where the hearing aid cabinet 55 is provided with a volume control knob positioned on the exterior thereof it is necessary to provide a space between the front of this cabinet and the inner surface of the wall 57 sufficient to receive this knob. This volume control is arranged to be accessible from the exterior of the amplifier cabinet either through the door 63 or through the top of the cabinet.

Figure 12A:
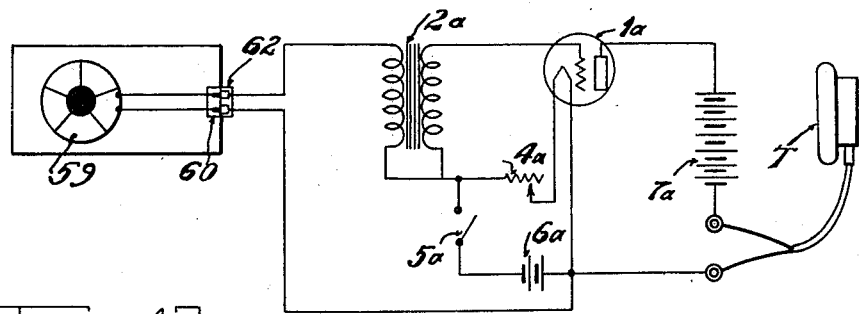

The hearing aid cabinet is retained in position inside of the amplifier cabinet by the members 56, as illustrated in Fig. 12. A microphone aperture 59, which is in alignment with the doors 63, positioned on the front of the cabinet as illustrated in Fig. 13, is provided to the hearing aid cabinet 55. A jack 60, which is connected to the microphone 59 of the hearing aid, as illustrated in Fig. 12a, is attached to the bottom 62 of the cabinet 55. A plug 62, having prongs to be received by suitable contacting members of the jack 60, is positioned on the false bottom which supports the amplifier apparatus or upon the bottom of the cabinet 43. Connections are also provided between the prongs of the plug 61 and the primary winding of the amplifier input transformer 2ª which is connected to the tube 1ª. Tube 1ª is connected to the filament battery 6ª through the switch 5ª and the rheostat 4ª. This switch and rheostat may be combined into one unit so that the switch is operable by the rheostat control. A battery 7ª is connected to energize the tube anode circuit and the circuit of the telephone receiver T.

When the hearing aid 55 is to be used without an amplifier it is removed from the amplifier cabinet and the plug of the hearing aid telephone receiver is inserted into the jack 60. This same telephone receiver may be connected to the output transformer of the amplifier corresponding to transformer 3 of Fig. 1 when the hearing aid is employed in conjunction with the amplifier.

Where it is desired to employ a separate microphone and telephone receiver with the amplifier the hearing aid apparatus 55 illustrated in Fig. 14 is provided with a plug 66 to which both the hearing aid microphone 67 and telephone receiver 68 are connected. The jack 69 is provided with contacts 70, 71 and 72 which are connected to the terminals of the secondary of the transformer 74 and the telephone receiver 73, respectively. Additional contacts 77, 78 and 79, which are connected to the primary of the transformer 75 and to the microphone 80, and a suitable battery, respectively, are also provided to the jack 69.

In operation the circuit between the telephone receiver 73 and the secondary winding of the transformer 74 and the circuit between the primary winding of the transformer 75 and the microphone 80 are interrupted when the plug 66 is inserted into the jack 69. The circuits between the hearing aid microphone 67 and the telephone 68 and the input transformer 75 and output transformer 74, respectively, are simultaneously established. The hearing aid may thus be conveniently used with the amplifier.

Where it is desired the microphone 80 and telephone receiver 73 may be eliminated from the amplifier and the jack 66 simplified by eliminating the contacts 72 and 79 and the connections thereto.

A further modified form of this invention is embodied in the apparatus which is connected in accordance with the circuit diagram illustrated in Fig. 15. In this embodiment of this invention the input circuit of the vacuum tube 83 is connected to the secondary of the transformer 81 and the output circuit is connected to the primary of the transformer 84. Sources of current supply 87 and 88 and rheostat 86 are also provided to the amplifier.

A switch 82 with contacts M, N, O, P and Q connected to taps of the primary winding of the transformer 81 is provided to adjust the characteristics of the transformer to match different types of microphones commonly used in hearing aid apparatus. A similar switch 85 with contacts R, S, T, U and V connected to different taps of the second winding of the transformer 84 is provided to match the characteristics of the transformer and the telephone receiver connected to the secondary of this transformer.

In practice where the booster amplifier is used with different types of microphones and receivers it is desirable that the characteristics of the transformers be adjusted so that results obtained from the amplifier are satisfactory. This adjustment is simplified by the switches 82 and 85.

These switches may be built into a unitary structure operable as a unit, as illustrated in Fig. 16 of the drawings in which they engage separate sets of contacts M, N, O, P, Q and R, S, T, U, V respectively, which are connected as illustrated in Fig. 15. A member 89 of insulating material is mounted on the shaft 92 which is controlled by a small knob (not illustrated) is provided to support the switch arms 82 and 85. Strips 90 and 91 of brass or similar metallic material are positioned upon the panel 93, which supports the contacts, for engaging the switch arms 85 and 82, respectively, for making contact therewith.

In practice the different positions of this switch mechanism are preferably designated in such a way that the operator can determine which position to use with microphone and telephone receivers of different characteristics. For example, the taps corresponding to the low impedance transformer winding taps are designated for use with hearing aids which employ microphones and telephone receivers having a resistance of between five and ten ohms. For units having a resistance averaging around one hundred ohms the switch is connected to the higher impedance transformer winding taps.

Other methods of accomplishing the results set forth herein may be devised within the scope and spirit of this invention, and it is, therefore, not desired to limit this invention to the exact details set forth in the foregoing specification except in so far as those details may be defined by the appended claims.

What I claim and desire to secure by Letters Patent of the United States is as follows:

1. In hearing aid amplifiers, the combination of a hearing aid comprising a microphone, a telephone receiver, plug and jack means for connecting said microphone and receiver together, an electron discharge device having input and output circuits, a transformer connected to said input circuit, a second transformer connected to said output circuit, jack means cooperating with said plug means for connecting said microphone to said input transformer, and jack means cooperating with said plug means for connecting said telephone receiver to said second or output transformer.

2. In hearing aid amplifiers, the combination of an electron discharge device having input and output circuits, an input transformer connected to said input circuit and an output transformer connected to said output circuit, jacks connected to said input transformer and said output transformer, a hearing aid comprising a microphone, a telephone receiver, and means including a plug for connecting said microphone and said receiver either together or to said input and output transformers whereby said hearing aid is adapted for use with said electron discharge device amplifier.

3. In hearing aid amplifiers, the combination of an electron discharge device having input and output circuits, transformers connected to said input and output circuits, a hearing aid including a microphone, a telephone receiver, and means including a plug connected to said microphone and said receiver for connecting said microphone and receiver together, jacks connected to said input and output transformers for receiving said hearing aid microphone and telephone receiver plug means whereby said hearing aid may be connected to said electron discharge device input and output transformers.

4. In hearing aid amplifiers, the combination of an electron discharge device having input and output circuits, an input transformer connected to said input circuit and an output transformer connected to said output circuit, a hearing aid apparatus comprising a microphone, a telephone receiver and a plug, means associated with said plug for completing the circuit between said microphone and said telephone receiver, jacks connected to said input and output transformers for receiving said plug whereby said hearing aid apparatus is adapted for use with said electron discharge device amplifier.

5. In hearing aid apparatus adapted to be used either as a unit or with an amplifier, the combination of a microphone, a battery for energizing said microphone circuit, means for supporting said microphone and said battery, a sound reproducer for reproducing the waves picked up by said microphone, connections between said microphone, said battery and said reproducer, switching means interposed in said connections and including a plug and jack for permitting said microphone and battery to be connected directly to said sound reproducer or to said amplifier.

6. In hearing aid amplifiers, the combination of a hearing aid comprising a microphone, a telephone receiver and plug and jack means for connecting said microphone and receiver together for use as a hearing aid, an electron discharge device having input and output circuits, a transformer connected to said input circuit, jack means cooperating with said plug means for connecting said microphone of said hearing aid to said input transformer, and jack means cooperating with said plug means for connecting said telephone receiver of said hearing aid to said output circuit.

7. In hearing aid apparatus the combination of a hearing aid comprising a microphone, a telephone receiver and means for connecting said microphone and receiver, said means comprising a pair of plugs, one being connected to said microphone and the other being connected to said receiver and a connector for receiving said plugs and connecting said microphone to said receiver, an electron discharge device having input and output circuits, means for receiving the plug of said microphone connected to said input circuit and means for receiving the plug of said telephone receiver connected to said output circuit whereby said hearing aid is adapted for use with said electron discharge device.

8. In hearing aid apparatus the combination of a hearing aid including a microphone and electrically actuated means connected to said microphone for translating modulated electrical energy derived from said microphone into vibratory energy, a cord for connecting said microphone and said means together, a plug and jack switching device connected into said cord for connecting said microphone and said means together, an amplifier including an electron discharge device and input and output circuits, jacks connected to said input and output circuits, said jacks being adapted to cooperate with the plug of said plug and jack switching device for connecting said microphone and said means to said amplifier.

9. In portable hearing aid apparatus, the combination of a cabinet having front, back sides joining said front and said back and top and bottom, said top being hinged to said back, a handle attached to said top for carrying said cabinet, a removable false bottom in said cabinet, a door hinged to said front of said cabinet for closing an aperture formed in said front, a microphone inside of said cabinet, means for supporting said microphone in line with said aperture, a vacuum tube socket attached to said false bottom, an audio frequency transformer attached to said false bottom, a shelf, means for supporting said shelf on said false bottom directly above said transformer, spring contact members attached to the edges of said shelf, a dry cell supported by said shelf between said contact members, a second shelf supported on said false bottom adjacent to said top, said second shelf having a substantially circular recess cut therein, a telephone receiver positioned in said recess, and a plurality of electrical connections for connecting said microphone, transformer, socket and receiver together.

SAMUEL GORDON TAYLOR.